(No Model.)

G. A. BAKER.
SPRING COUPLING LINK.

No. 271,592. Patented Feb. 6, 1883.

WITNESSES.
James T. Dorsey.
A. E. Leavitt.

INVENTOR.
George A. Baker
By Sylvanus Walker
Attorney

UNITED STATES PATENT OFFICE.

GEORGE A. BAKER, OF BOSTON, MASSACHUSETTS.

SPRING COUPLING-LINK.

SPECIFICATION forming part of Letters Patent No. 271,592, dated February 6, 1883.

Application filed October 12, 1882. (No model.)

*To all whom it may concern:*

Be it known that I, GEORGE A. BAKER, of Boston, in the county of Suffolk and State of Massachusetts, have invented a new and useful Improvement in Spring Coupling-Links, of which the following is a specification.

The object of my invention is to provide a cheap, simple, convenient, and durable spring coupling-link for ships' anchor-chains, or for securing shrouds, booms, or other parts of the rigging, or for any purposes for which coupling-links and similar devices have heretofore been employed; and it consists in the construction, combination, and arrangement of the several parts of the device, as hereinafter more fully described, and set forth in the claim.

Figure 1:
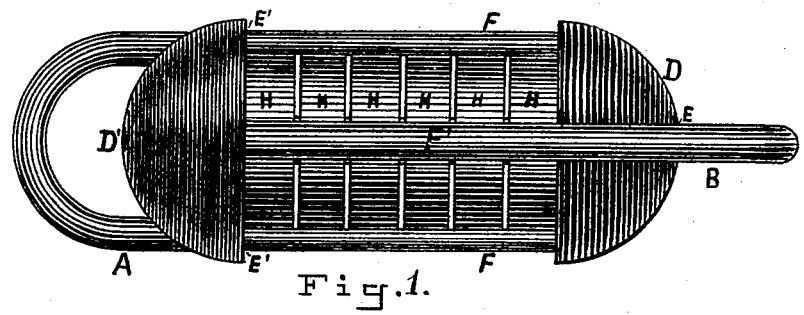
Figure 2:
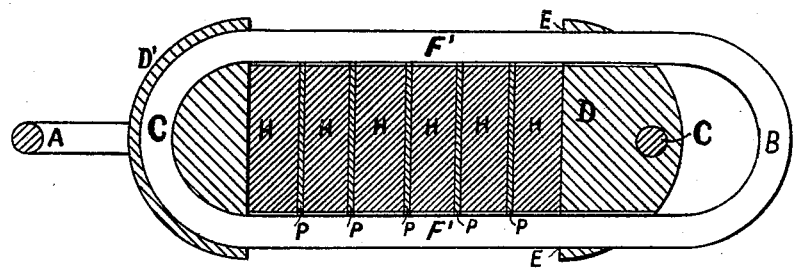
Figure 3:
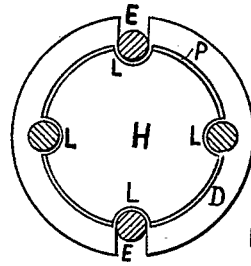
Figure 4:
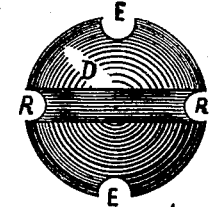
Figure 5:
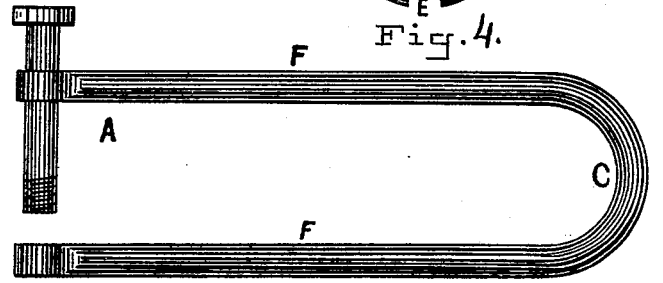

Figure 1 represents a side elevation of a coupling-link constructed according to my invention. Fig. 2 represents a longitudinal section of the same. Fig. 3 represents a cross-section of the same. Figs. 4 and 5 represent details of construction and modification of the same.

A and B represent the two coupling-links, formed of rods of round or other suitable wrought-iron bent into oblong shape, leaving the two sides F parallel and of equal length, or as desired, being preferably of the form shown in Fig. 2, or bent mid-length, so as to form a portion of the link A of U-shape. Then the curved central portion or end, C, of the link I place in a suitable mold and cast therein the head portion D, having formed therein on opposite sides thereof suitable grooves, E E, adapted to receive therein the two sides F of a similar-constructed link, B, which is likewise provided with a cast head portion, D', having formed therein on opposite sides thereof corresponding grooves, E' E', which are adapted to receive therein the sides F F of the said link A, which parts are adapted to slide together loosely, and when the two links A and B, with their grooved heads D D', are placed together with their heads opposite each other and their body portions or sides F and F' at right angles with each other, and then the ends of each link A and B, or each pair of parallel sides F, are bent inwardly and welded together, as shown in Figs. 1 and 2. Then the intermediate space between the said heads D D' is provided with a series of elastic or rubber disks, H, provided upon their peripheries with four transverse or lateral grooves, L, adapted to fit or receive the said sides F of the said links A B, and between the said rubber disks H are placed metal disks P of similar shape, and likewise provided with grooves which fit loosely between the said sides F F' of the said links, so as to form a compression-spring. The sections or disks of rubber H and intervening metal plates or disks, P, prevent the rubber from "flowing" or bulging, when pressure is brought to bear upon the same, by compression through the links and heads being drawn or forced in opposite directions by the weight or strain brought to bear upon the same when in use.

It will be evident that the ends of the said links A B may be formed with eyes, and a bolt or pin inserted through the same, so as to form a shackle, as shown in Fig. 5, instead of their being welded together, as above described, and that the said ends of the links may be provided with hooks, swivels, rings, or other desired devices, and that instead of said heads D D' being cast upon the end portion of the links, as above described, (whereby the same are firmly united together,) the said heads may be cast separate and provided with a suitable groove, R, to receive the bent or loop portion C of the link, as shown in Fig. 5, in which case the heads are placed in position within the link and then the rubber disks and metal plates inserted, as before, thus forming the spring, as previously described. The grooves across the edges of said disks of rubber and metal may be dispensed with, and the disks constructed of smaller diameter, so as to fit between the link sides F, which in either case form guides to keep the same in proper relative position therewith, thereby dispensing with a central hole through such disks for the purpose of retaining them in such position by means of a central rod, as heretofore practiced.

I am well aware that spring-links are well-known devices heretofore employed in connection with harnesses and draft devices. Therefore I do not broadly claim such as my invention.

Having thus described my invention, what I claim is—

In a spring coupling-link, the continuous or welded link A, having the head D, provided with grooves E upon opposite sides thereof, and the link B, having the head D', provided with grooves E upon opposite sides thereof, said grooves being adapted to guide and retain the said links in position with each other, and the central compression-spring composed of a series of rubber disks, H, and metal disks P, provided upon their edges with grooves which receive the sides of the links, substantially as described, and for the purposes set forth.

GEORGE A. BAKER.

Witnesses:
SYLVENUS WALKER,
DAVID BAKER.